Figure 1:
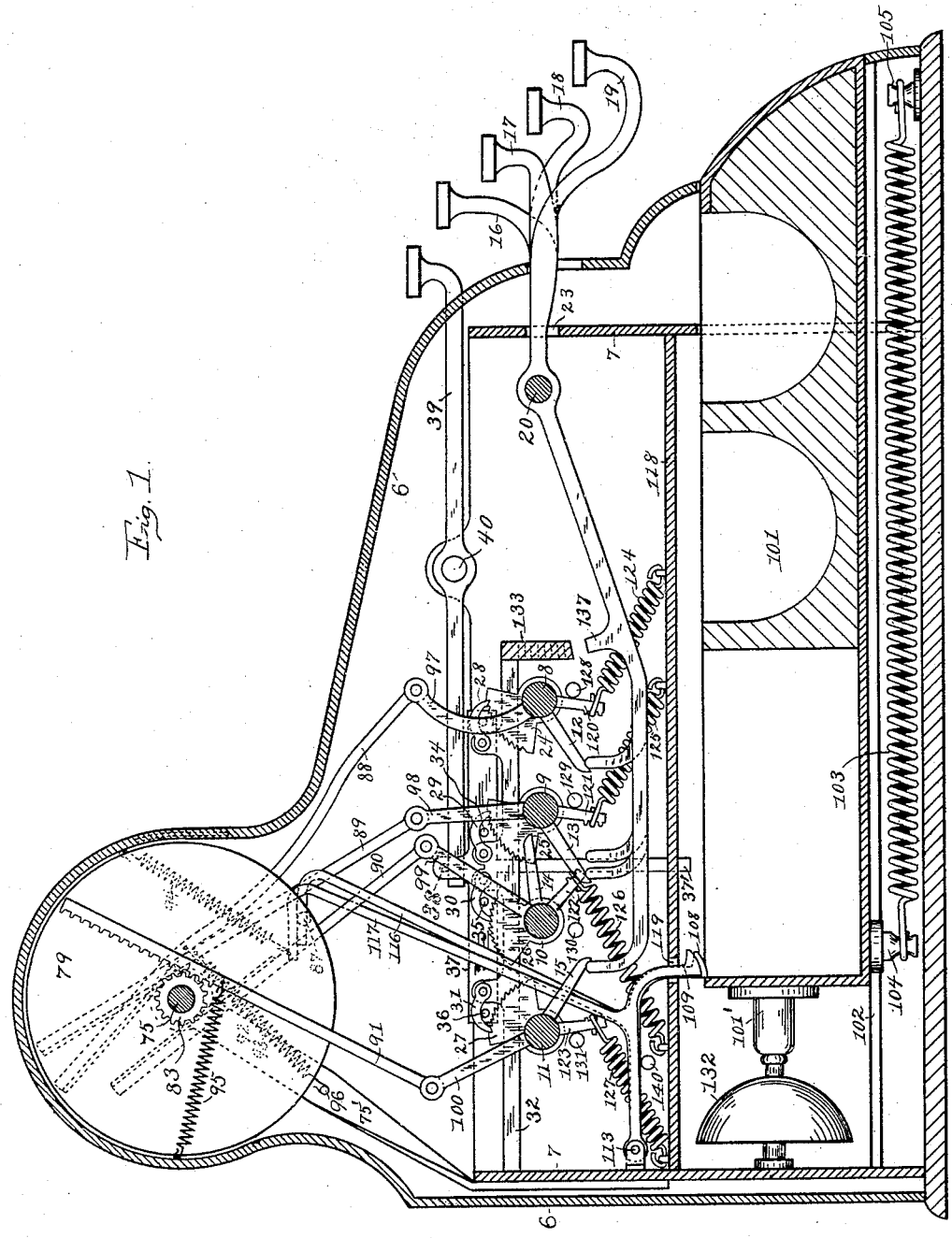

(No Model.) 4 Sheets—Sheet 1.

C. PRICE.
CASH REGISTER AND INDICATOR.

No. 522,389. Patented July 3, 1894.

WITNESSES:
S. R. Casselman
R. W. Price

INVENTOR:
Cyrus Price,
BY Eugene L. Arnott,
ATTORNEY.

(No Model.) 4 Sheets—Sheet 2.
C. PRICE.
CASH REGISTER AND INDICATOR.

No. 522,389. Patented July 3, 1894.

WITNESSES:
S. R. Casselman
R. W. Price

INVENTOR:
Cyrus Price,
BY
Eugene L. Arnott,
ATTORNEY.

(No Model.)  4 Sheets—Sheet 3.

C. PRICE.
CASH REGISTER AND INDICATOR.

No. 522,389. Patented July 3, 1894.

WITNESSES:  INVENTOR:

(No Model.) 4 Sheets—Sheet 4.
C. PRICE.
CASH REGISTER AND INDICATOR.
No. 522,389. Patented July 3, 1894.
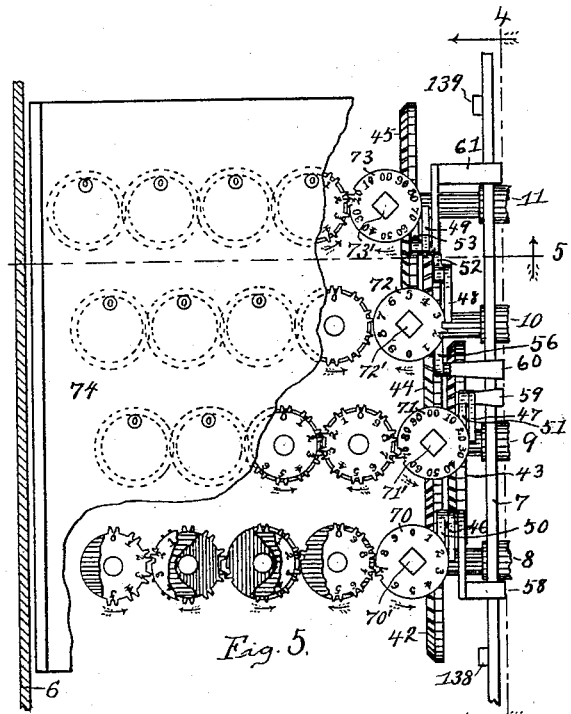
Fig. 5.
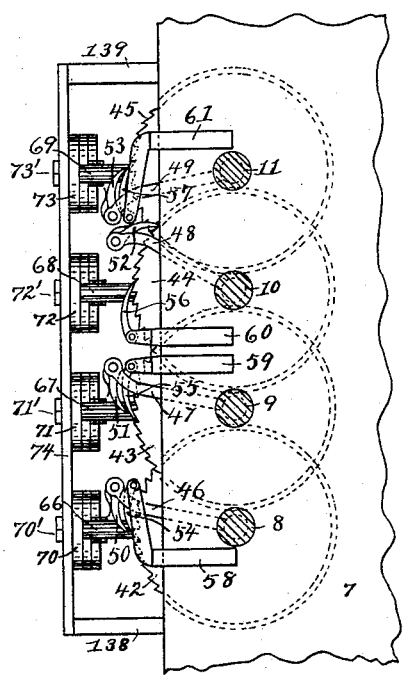
Fig. 6.
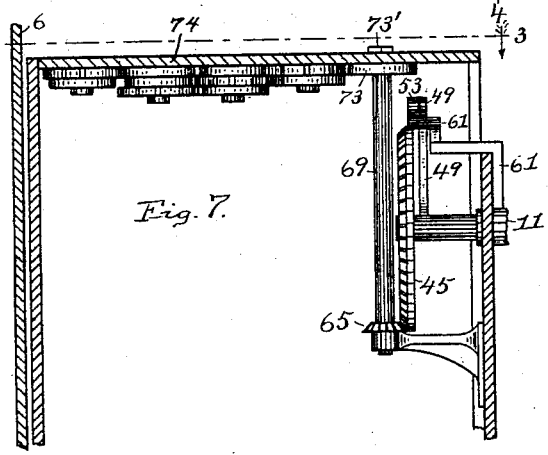
Fig. 7.
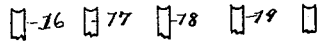
Fig. 8.
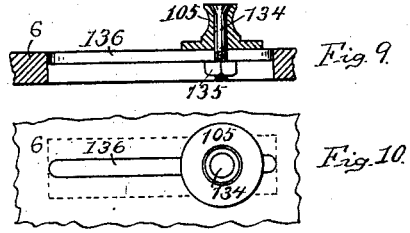
Fig. 9.
Fig. 10.
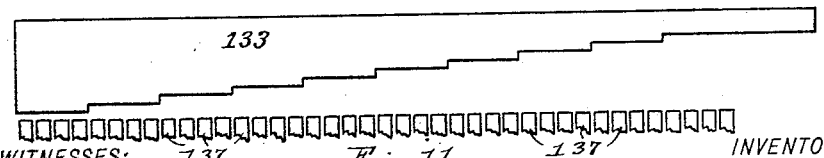
Fig. 11.
WITNESSES:
S. R. Casselman
R. W. Price
INVENTOR:
Cyrus Price,
BY Eugene L. Arnott,
ATTORNEY.

UNITED STATES PATENT OFFICE.

CYRUS PRICE, OF GREENFIELD, OHIO.

CASH REGISTER AND INDICATOR.

SPECIFICATION forming part of Letters Patent No. 522,389, dated July 3, 1894.

Application filed October 26, 1893. Serial No. 489,178. (No model.)

*To all whom it may concern:*

Be it known that I, CYRUS PRICE, a citizen of the United States, residing at Greenfield, in the county of Highland and State of Ohio, have invented certain new and useful Improvements in Cash Registers and Indicators, of which the following is a specification, reference being had to the accompanying drawings.

My invention relates to improvements in cash registers and indicators for the use of store-keepers and others, in which a series of key-levers is employed in connection with indicating and registering mechanisms, to indicate and register the amounts of the various purchases.

The object of my invention is to produce a register and indicator of the character described which will be comparatively free from complication, strong and able to stand rough usage, cheap in manufacture, and incapable of being "beat" by any dishonest clerk or attendant.

My present invention is of a two-fold character, being partly in the nature of an improvement upon the register set forth in my previous application, Serial No. 442,226, filed August 5, 1892, and partly in the nature of an independent and original invention.

Cash registers and indicators are generally divided, by those engaged in their manufacture and sale, into two classes, known, respectively, as "total adding" and "detail adding" machines. My invention, however, does not belong, strictly speaking, to either of these classes. I employ four rows or banks of operating-keys, and a series of registering or adding disks for each bank of keys. Each series of registering disks totalizes the values of the keys of the corresponding bank which have been operated. Hence in order to obtain the total amount registered it is only necessary to take the footing of the amounts shown on the four series of registering disks. Some features of my invention, however, may be used in the other classes of machines.

My register consists partly, speaking in general terms, of the four rows or banks of operating-keys, four rock-shafts, one shaft for each bank of keys, four series of registering disks, one series for each rock-shaft, four indicating wheels, one wheel for each rock-shaft, and operative connections between these parts. Upon operating any key of any bank the corresponding shaft is rocked a certain degree, corresponding to the value of the key, the corresponding indicator wheel is rotated to display the value of the key, and the corresponding registering disks are operated to add in the value of the key.

I have endeavored in my invention especially to avoid complication of parts, which has been a serious difficulty in registers heretofore, and it will be observed that each bank of keys, with its corresponding rock-shaft, indicator wheel, and registering disks, is in a certain sense independent of the other banks and their corresponding shafts, wheels, and disks, and any bank of keys, with its corresponding rock-shaft, indicator wheel, and registering disks, may be left out entirely without injuring the machine except by limiting its capacity. Hence it will be seen that my invention partakes of the nature of four independent mechanisms combined and co-operating to form a complete register. These mechanisms partly consist each of a bank of operating-keys, a rock-shaft, an indicator wheel, registering disks, and connecting parts, and they are so similar and so nearly identical in form and mode of operation that I shall describe the corresponding parts of each together in the following description. It will be observed that one of these mechanisms—especially the one involving the bank of keys bearing values from one cent to nine cents, inclusive—could be used alone to form a complete register and indicator of limited capacity; and it will also be observed that such a limited register would be a "total adding" machine. Hence it will be apparent that my invention partakes of the nature of four "total adding" machines, each in itself of limited capacity, having only ten fixed values on its keys, combined and co-operating together to form a complete register of large capacity, but not "total adding" as to all the keys.

Figure 2:
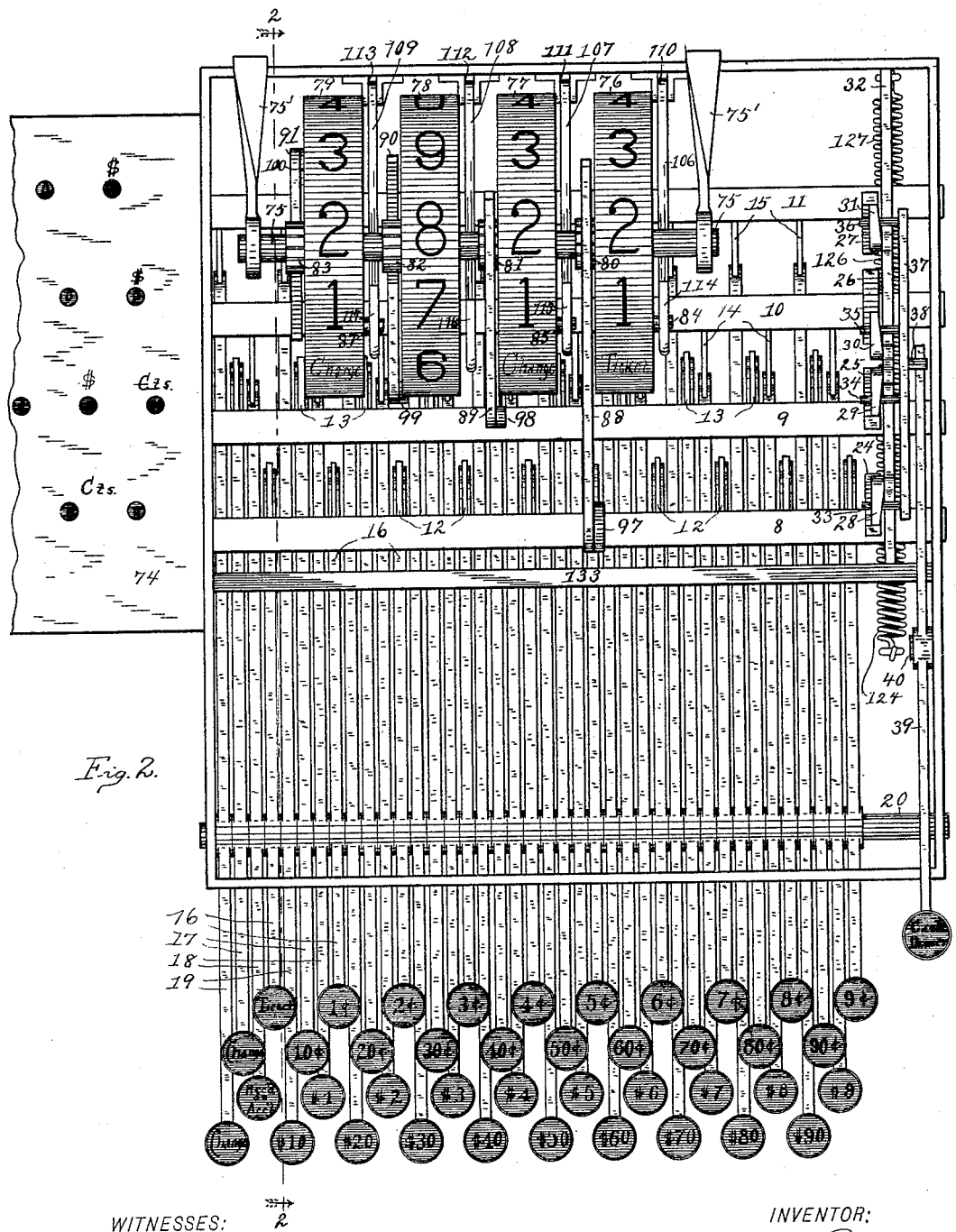
Figure 3:
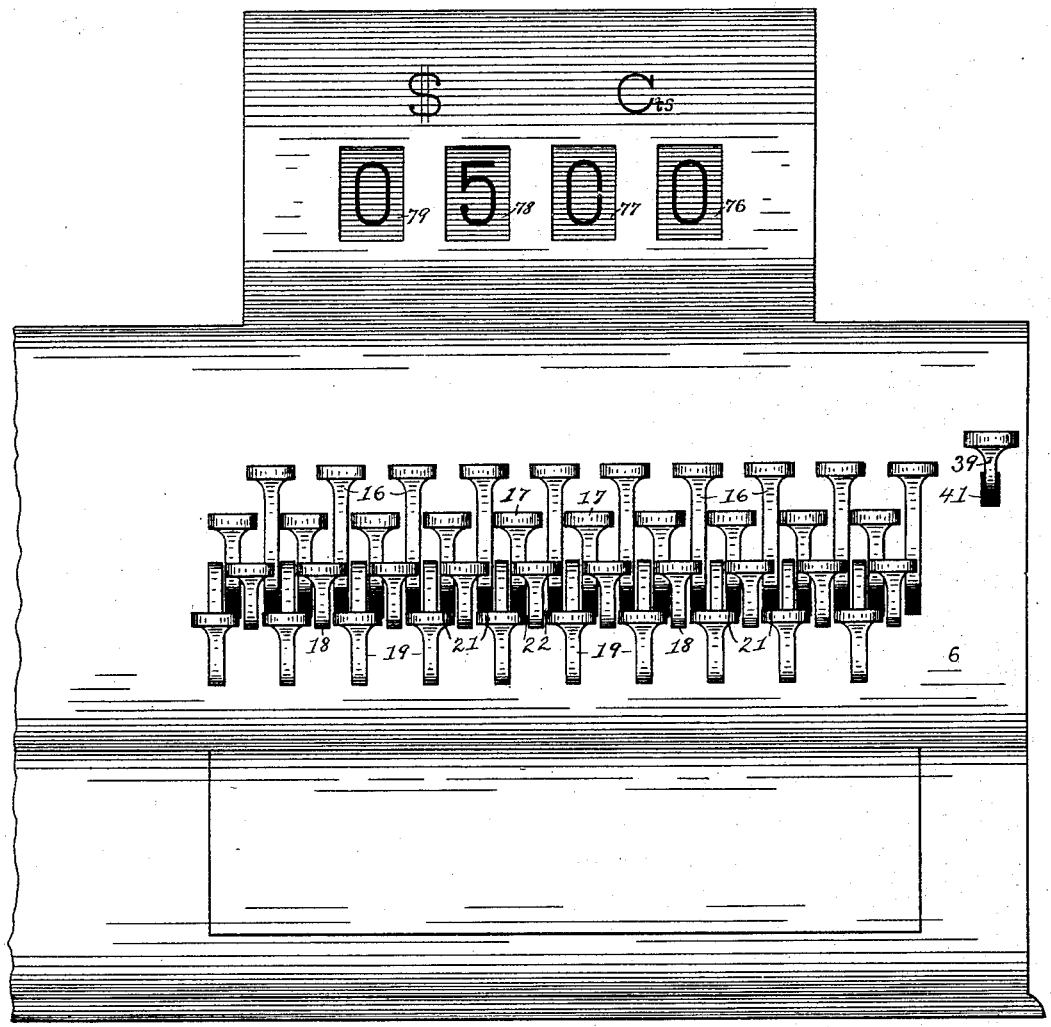
Figure 4:
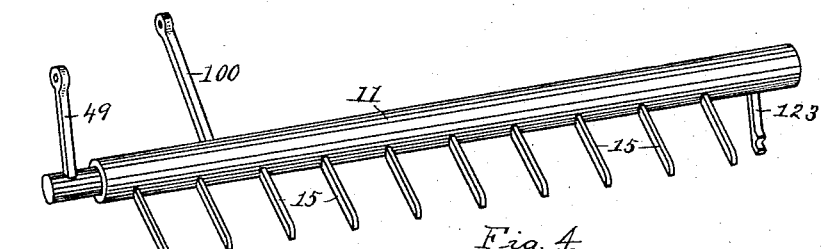

In the accompanying drawings Figure 1 is a longitudinal vertical section, taken on line 2 2 of Fig. 2, of a cash register and indicator embodying my invention. Fig. 2 is a top or plan view of the register and indicator with the casing removed. Fig. 3 is a front elevation. Fig. 4 is a perspective view of one of the rock-shafts, with its projecting arms, the toothed segment being omitted. Fig. 5 is a top or plan view, on line 3 of Fig. 7, showing the registering disks and their connections with the rock-shafts, a portion of the covering plate being broken away. Fig. 6 is a view of the same, taken on line 4 4 of Fig. 5, and looking in the direction of the arrows. Fig. 7 is a sectional view, taken on line 5 of Fig. 5, and looking in the direction of the arrow, showing one set or series of the registering disks and their connection with the rock-shaft. Fig. 8 is a detail showing the form of the inner ends of the key-levers. Fig. 9 is a detail, showing a longitudinal vertical section of one of the knobs and the part of the casing to which it is secured. Fig. 10 is a top or plan view of the same. Fig. 11 is a detail showing the normal relation of the ends of the upward projections on the key levers to the transverse bar with steps or graduations on its under side to secure the proper limit of motion to each key-lever.

In the drawings the numeral 6 represents the casing or cabinet of the machine, which may be made of wood or metal and of any plain or ornamental design desired.

7 represents the main frame, preferably made of metal, which supports the operating parts of the machine.

8 9 10 11 are transverse rock-shafts, journaled in the frame 7. Shaft 8 has—in this instance—ten short radial arms 12 of equal length projecting downward and rearward in the same plane. Shafts 9 10 11 have each a similar series of arms, represented, respectively, by 13 14 15. Arms 14 and 15, however, which project, respectively, from shafts 10 and 11, point downward and forward instead of downward and rearward.

16 17 18 19 represent, respectively, the four rows or banks of keys. There are in the present instance ten keys in each bank. These keys are all pivotally mounted upon a transverse shaft 20, which is rigidly secured in frame 7.

The finger-pieces of keys 16 of the highest bank are marked, respectively, from left to right, looking at Fig. 2, with the values 1c, 2c, 3c, 4c, 5c, 6c, 7c, 8c, 9c, and the key at the extreme left is marked "Ticket." The finger-pieces of keys 17 of the next lower bank have the values 10c, 20c, 30c, 40c, 50c, 60c, 70c, 80c, 90c, and "Change" at the left. The finger-pieces of keys 18 of the next lower bank have the values $1, $2, $3, $4, $5, $6, $7, $8, $9, and "Rec'd on accc't" at the left. The finger-pieces of keys 19 of the lowest bank have the values $10, $20, $30, $40, $50, $60, $70, $80, $90, and "Charge" at the left.

The keys are all placed side by side on shaft 20, and are arranged, from left to right, looking at Fig. 2, first a key 19, then a key 17, then a key 18, then a key 16, then a key 19 again, and so on throughout the remaining keys. This arrangement gives convenient space for the finger-pieces of the keys. It may here be observed that on shaft 20 three keys are always interposed between two keys of any bank.

The inner end of each key-lever is curved upward and placed in engagement with one of the radial arms projecting from a rock-shaft. Keys 16 engage arms 12, keys 17 engage arms 13, keys 18 engage arms 14, and keys 19 engage arms 15. The inner ends of the key-levers are preferably made trough-shape, as shown in Fig. 8, in order that they may not slip laterally out of engagement with the arms.

The casing has the usual slots 21 for the keys, with bars 22 between the keys to hold the latter in proper position. The frame 7 also has a transverse slot 23 for the keys.

Rock-shafts 8 9 10 11 carry, respectively, toothed segments 24 25 26 27. Pawls or locking-dogs 28 29 30 31 are placed, respectively, in engagement with said toothed segments. These locking-dogs are pivotally attached to lugs projected upward from stationary bar 32.

Pins 33 34 35 36 project laterally from the vertically-movable bar 37 and pass, respectively, between said locking-dogs and toothed segments. A pin 38 projects laterally from bar 37, on the side opposite to the pins just mentioned. Bar 37 has an arm 37' which extends vertically downward from its central portion and passes through the horizontal partition 118, having a bearing therein, to prevent said bar from tilting.

A special key 39, which does not belong to either of the banks mentioned, is pivotally placed upon a short shaft or stud 40 projected from the frame 7, and has its inner end in engagement with the under side of pin 38. A slot 41 is formed in the casing for this key. The finger piece of this key bears the words "Cash drawer."

42 43 44 45 are wheels mounted, respectively, upon rock-shafts 8 9 10 11. These wheels are rotatable, and are preferably placed outside of frame 7, on the ends of said shafts. They are provided with ratchet teeth and also with bevel-gear teeth.

46 47 48 49 are short upright arms carried, respectively, by rock-shafts 8 9 10 11. These arms are placed, respectively, near the rotatable wheels 42 43 44 45.

50 51 52 53 are pivoted spring-pressed pawls, carried, respectively, by said arms. These pawls engage, respectively, with the ratchet teeth of wheels 42 43 44 45.

54 55 56 57 are locking-dogs, preferably spring-pressed, which are carried, respectively, by bent arms 58 59 60 61, projected up from frame 7. These arms are formed in such manner as not to interfere with the motion of arms 46 47 48 49. Said locking-dogs are in engagement respectively, with the ratchet teeth of wheels 42 43 44 45. Pawls 50 51 52 53, respectively, rest normally upon these locking-dogs 54 55 56 57. The engaging end of each pawl is the space of one ratchet tooth from the engaging end of the locking-dog on which it rests.

62 63 64 65 are small wheels horizontally-disposed and provided with bevel-gear teeth, and meshing, respectively, with the larger wheels 42 43 44 45. (Wheels 62 63 and 64 are not shown in the drawings.)

66 67 68 69 are rotatable vertical shafts upon which the wheels 62 63 64 65, respectively, are rigidly mounted. These shafts carry, respectively, at their upper ends, the rigidly-mounted registering disks 70 71 72 73. Disks 70 and 72 bear on their upper sides, respectively, the numerals 0 1 2 3 4 5 6 7 8 9. Disks 71 and 73 bear on their upper sides, respectively, the numerals 00 10 20 30 40 50 60 70 80 90.

70' 71' 72' 73' are squared projections on the upper sides of disks 70 71 72 73, respectively, adapted to receive a key to return the disks to zero. Locking-dogs 54 55 56 57 must of course be disengaged from wheels 42 43 44 45 before the registering disks can be returned to zero. Said locking-dogs, being spring-pressed, prevent the registering disks from being carried too far forward by momentum. Each disk 70 71 72 73 is the first of a train or series of registering or adding wheels, each of which bears on its upper side the numerals 0 1 2 3 4 5 6 7 8 9. These adding wheels are of a well-known character, and need not be particularly described at this time. They are so arranged that the complete revolution of each wheel causes the adjacent wheel, or the wheel of the next higher order, to move one space, and thus show the number of revolutions of the first-named wheel. In the present instance each toothed wheel, except the last, or the one of the highest order, has a companion disk with one tooth only, and this single tooth engages the teeth of the adjacent wheel once during each complete revolution of the first-named wheel. But any well-known system of adding wheels, in which motion is communicated from one wheel, at fixed intervals, to another wheel to register the total amount, may be used. A plate 74 is placed just above the adding disks, and this plate has the usual openings through which one figure on each disk may be seen.

A suitable locking lid or door (not shown in the drawings) may be provided in the casing to cover the adding disks from view, and to obtain access thereto when desired.

75 is a shaft rigidly mounted in suitable brackets or supports 75', projected up from frame 7.

76 77 78 79 are indicator wheels rotatably mounted on shaft 75. Each indicator wheel has the numerals 0 1 2 3 4 5 6 7 8 9 on its periphery, and each has also a word such as "Ticket," "Rec'd on acc't," "Change," or "Charge" placed between "0" and "1" for a purpose hereinafter explained. These words correspond to the words on the keys, already described. Other words, such as "Check," "Paid out," &c., may be substituted, if desired.

80 81 82 83 are small toothed wheels rigidly secured, respectively, to indicator wheels 76 77 78 79, or they may be integral with said indicator wheels.

84 85 86 87 are pins projected, respectively, from the sides of wheels 76 77 78 79. Each pin projects from the side of the wheel opposite the small toothed wheel.

88 89 90 91 are rack-bars which are in engagement, respectively, with the small toothed wheels 80 81 82 83. Springs 92 93 94 95, respectively, hold rack-bars 88 89 90 91 in engagement with wheels 80 81 82 83. These springs have their outer ends secured, respectively, to the casing or other suitable points. A rod 96, to which springs 93 and 94 are attached, extends between the brackets 75'.

97 98 99 100 are arms carried, respectively, by rock-shafts 8 9 10 11, and pivotally connected, at their outer ends, respectively, with the ends of rack-bars 88 89 90 91. Arm 97 is curved to avoid interference with bar 133.

101 is a cash drawer.

102 are bars or cleats, one at either side, on which the drawer rests.

103 is a spring for propelling the drawer.

104 is a knob depended from the drawer.

105 is a similar knob extending up from the bottom of the casing. Spring 103 is secured to these knobs.

106 107 108 109 are catches for holding the drawer closed, and are pivoted, respectively, at 110 111 112 113. These catches, respectively, have upward arms or projections 114 115 116 117. These arms or projections have their upper ends, respectively, bent or curved, and these bent or curved end portions, respectively, rest normally upon pins 84 85 86 87. The catches are thus held normally out of engagement with the cash drawer, until a key is operated, as will be hereinafter explained.

118 is a horizontal partition between the cash drawer and the registering mechanism. This partition has a transverse slot 119 for the catches.

120 121 122 123 are short radial arms depended, respectively, from rock-shafts 8 9 10 11.

124 125 126 127 are springs. These springs have their lower ends, respectively, secured to partition 118, and their upper ends, respectively, secured to the lower ends of the arms 120 121 122 123.

128 129 130 131 are short pins or studs projected from frame 7 and extended just far enough to come in contact, respectively, with arms 120 121 122 123. These pins or projections prevent the rock-shafts from rotating backward beyond their initial positions, respectively.

Knob 105, Figs. 1, 9, and 10, is held in position by a bolt 134 and nut 135. Casing 6 has a short longitudinal slot 136 in the front part of its bottom, and bolt 134 passes through this slot. By loosening nut 135 and moving knob 105 backward and forward along the slot 136 and then tightening the nut the tension of spring 103 may be increased or diminished, as will be readily understood.

133 is a transverse bar with steps or graduations on its under side. These steps are uniform in size, and of an ascending order. Each step extends across the path of travel of four key-levers, one key-lever of each bank. By this means the corresponding key-levers of each bank have the same limit of motion.

137 are upward projections, one on each key-lever, shown in Fig. 1, and with the upper ends broken in Fig. 11. These projections contact with the steps on bar 133, and thus limit the motion of the key-levers. The key-levers could themselves be made to contact with bar 133, but these projections are more easily adjusted to the proper length or position.

140 is a transverse rod or bar upon which the catches 106 107 108 109, respectively, rest, when in their lower positions, obtained upon rotating the indicator wheels.

The operation of my register and indicator, so far as not already described, is as follows: Suppose, first, that the key whose finger-piece is marked "Ticket" is depressed. The projection 137 will come in contact with the first and lowest step or graduation on the under side of bar 133, and limit the motion of the key. The inner end of the key will elevate the arm 12 with which it engages and thus rock the shaft 8. The arms 46, 97, and 120 and the toothed segment 24 will move with the shaft. Pawl 50 will move forward on locking-dog 54 until its engaging end just reaches the engaging end of the locking-dog. Wheel 42 will not be engaged by the pawl, and hence will not be rotated, being held by the spring-pressed locking-dog 54. Hence the registering disks will not be moved. Rack-bar 88 will be drawn downward and indicator wheel 76 will be rotated one space to show "Ticket" in the reading slot in the casing. Locking-dog 28 will engage the toothed segment 24 and thus prevent the rock-shaft 8 from returning to its initial position. Spring 124 will be stretched. Pin 84, upon the rotation of wheel 76, will be carried away from the bent end of arm 114, and catch 106 will drop down to engage the cash drawer. It will be observed that no registration takes place upon operating either of the keys "Ticket," "Change," "Rec'd on acc't" or "Charge," while the proper indication is made. These keys have no value, and should not operate the registering disks.

Suppose, now, that one cent is to be registered. The special key 39, marked "Cash drawer" will first be depressed. The inner end of this key will engage pin 38, which in turn, by means of bar 17 and pin 33, will elevate locking-dog 28 and disengage it from the toothed segment 24. The spring 124 will thereupon return the rock-shaft 8 to its initial position. The rack-bar 88 will at the same time be carried upward and will return the indicator wheel 76 to its initial position, and "0" will again appear in the reading slot. The pin 84 will again engage and elevate arm 114, thus disengaging catch 106 from the cash drawer, whereupon the drawer will be thrown forward by spring 103. The cent received will then be deposited in the cash drawer. It will be observed that the 1c key must be depressed before the drawer is closed. If the key be not depressed the drawer will not remain closed, since the indicator wheels will all be in the zero position, and consequently the pins carried by the wheels will hold the catches all out of engagement with the drawer. This is considered an important feature, because the clerk or attendant cannot forget to register, since the drawer will not remain closed until a key is depressed. It will be observed that the projection 137 carried by the 1c key will come in contact with the second step of bar 133, and hence this key will have about twice as long a stroke as the "Ticket" key. Hence the rock-shaft 8 and the parts operated by it will be moved twice as far as in the operation of the "Ticket" key. Pawl 50 in this case will move forward upon locking-dog 54 and engaging wheel 42, will rotate said wheel one tooth. Said wheel in turn will rotate wheel 62 (not shown) together with shaft 66 and register disk 70, and the latter will show "1" in the reading opening in plate 74. The indicator wheel 76 will be rotated two spaces and will show "1" in the reading slot. Catch 106 will drop down upon the transverse bar 140. When the drawer is closed the rearward projection 101' will engage bell 132 and sound an alarm. The drawer will engage and elevate the catch 106, which has the proper bevel on its end to ride over the engaging portion of the drawer, and then the catch will drop down to hold the drawer closed. It will be observed that the drawer can be opened again only by depressing the special key 39.

Suppose, now, that five dollars is to be registered. Key 39, marked "Cash drawer," will first be depressed, whereupon the drawer will be opened, and the indicating wheels will each show zero. The key 18 marked $5 will then be depressed, rock-shaft 10 will be rotated six spaces (the first space does not register, as explained above), indicator wheel 78 will be rotated six spaces and show "5," and the register wheel 72 will be rotated five spaces and show "5" in the reading opening. It will be observed that the "0" on each indicator wheel 76 and 77, which wheels have not been moved, taken together with the "5" on wheel 78, will show $5 and no cents. It will be observed that in the drawings I have represented the mechanism in the position it would assume upon depressing the $5 key.

Suppose now that ninety nine dollars and ninety nine cents is to be registered. Key 39 will first be depressed. The $90 key will then be depressed, which will rotate rock-shaft 11 ten spaces, which in turn will rotate indicator wheel 79 ten spaces and show "9" in the reading slot, and registering wheel 73 nine spaces and show "90" in the reading opening. The $9 key will then be depressed, indicator wheel 78 will show "9," and register wheel 72 will show "9." The 90c key will then be depressed. Indicator wheel 77 will show "9," and register wheel 71 will show "90." The 9c key will then be depressed. Indicator wheel 76 will show "9," and register wheel 70 will show "9." The indicator wheels taken together will show $99.99. The register wheels will show, respectively, $90, $9, 90c, and 9c, (provided no previous registration has been made.) The footing of these amounts will be $99.99, the total value registered.

If seven dollars and three cents is to be registered the $7 key and the 3c key will be depressed, and the indicator wheels will show $07.03, which is equivalent to seven dollars and three cents.

It will be observed that the key 39 should always be depressed before a registration is made. The operation of this key returns the indicator wheels to zero, and opens the cash drawer, and the latter will not remain closed until a key has been depressed.

It will be observed that when a key-lever is operated it returns at once to its initial position by gravity, while the rock-shaft can not return to its initial position until key 39 has been depressed. There is one prominent advantage in this arrangement. If a key should not be depressed the full distance of its proper stroke the indicator wheels will not show the proper amount. The key may then be depressed a second time, or in fact an indefinite number of times, without registering more than the single value of the key, because the shaft, when once rocked, does not return with the key, and the only effect of a second and greater depression of the key would be to rock the shaft further, but not twice over the same space. When any key has been depressed the full limit of its stroke the same key may be depressed again an indefinite number of times without moving the rock-shaft at all, provided the "Cash drawer" key has not been depressed. And furthermore, if a key of less than the proper value should be depressed, the proper key (of the same bank) may then be depressed, thus indicating and registering the proper amount.

It will be observed that not more than one key of any bank should be depressed to register one sale. For instance, in registering seventy cents the 30c key and the 40c key might be depressed; but such operation would only register and indicate forty cents, since the 40c key-lever would carry the arms of the rock-shaft out of the reach of the 30c key-lever. But this is no serious objection, since the indicator wheels will at once show the error, and the proper key—in this instance the 70c key—may then be depressed, thus giving the proper registration and indication. It will be understood that in depressing the 70c key after the 40c key has been depressed the rock-shaft will be rotated only three spaces.

It is obvious that the indicator wheels, instead of being read together to show the total value of each sale, might be read independently, and marked accordingly, after the manner of the ordinary indicating tablets. In this case each indicator wheel would be marked to correspond with the operating-keys. For instance, the 3c key upon being operated would show 3c on the indicator wheel, and the depression of the $70 key and the 4c key at one registration would show $70 on one indicator wheel and 4c on another indicator wheels. In this case the "$70" would take the place of the "7" on wheel 79, and the 4c would take the place of the "4" on wheel 76. A footing of the amounts shown, respectively, on the indicator wheels would be necessary in this case in order to obtain the total value of the registration.

An additional bell or alarm may be used, if desired, to be sounded when the drawer is opened, after the ordinary manner of arrangement and construction.

It may be stated that bell 132 is arranged to be sounded only when the drawer is closed. It is not necessary to describe the construction of the bell, which may be made of any well-known pattern, after the manner of door-bells. The advantage of this bell is found in the fact that if a certain amount be shown on the indicator wheels—say twenty-five cents, for example—and a sale of the same value be made, then the clerk or attendant, if negligent or dishonestly-inclined, can not safely leave the indicator wheels, without registering, to show the value of a second sale also, because in that case the alarm would not be sounded, and the proprietor, or any one acting for him, would know that the proper registration had not been made. The drawer can not be opened and closed again without first operating key 39, which returns the indicator wheels to zero. Hence if the bell be not sounded after each registration either the drawer must be left open or the keys unoperated, and in either case the conduct of the clerk or attendant would be investigated.

It may be stated here, for the better guidance of the builder of this machine, that certain parts of the mechanism should bear definite relations to certain other parts. I have contemplated giving each rock-shaft a maximum rotation, obtained upon depressing the key of highest value of the corresponding bank, of about one-fifth of one complete revolution. It is obvious then that if ten keys are used and the tenth key rotates the shaft the one-fifth of a revolution, the first key should rotate the shaft the one-fiftieth of a revolution. It is also obvious that the toothed segment carried by each rock-shaft should have ten teeth, one for each key of the corresponding bank. It is also obvious that if the rotatable wheel on the end of each rock-shaft rotates one-fifth of a revolution, save one tooth, while the smaller wheel with which it meshes—and the corresponding registering disk—rotates nine-tenths of a revolution to register the value of the key, then said rotatable wheel should be a little over four and one-half times larger in diameter than said smaller wheel. It is also obvious that the length of each arm which is pivoted to a rack-bar and the diameter of the toothed wheel with which the rack-bar engages should be such that one-fifth of a revolution of the rock-shaft will make nine-tenths of a revolution of the indicator wheel to indicate the value of the key. However, it will be understood that the rock-shaft may be given a greater or smaller maximum rotation, and any relations or arrangements other than those here indicated may be used, so long as the parts perform their proper functions to carry out my invention. I do not wish to limit myself by any means to the proportions or arrangements here indicated, but merely give this explanation in order to point out more clearly some of the features to be observed by the builder of this machine.

It may be stated that each rack-bar, when just at right-angles to the radial arm to which it is pivoted, travels through a slightly larger space than at any other position, the rock-shaft being rotated one space. The cause of this is apparent, since the end of said arm describes the arc of a circle. This difficulty, if indeed it be appreciable in any case, may be overcome either by making the toothed wheel, with which the rack-bar engages, in the form of an eccentric, or by placing the figures upon the periphery of the indicator wheel at the points which actually appear in the reading slot upon operating the various key-levers. Rack-bar 90 is carried upward, while rack-bars 88, 89, and 91 are carried downward, upon operating the corresponding rock-shafts, in order to rotate the indicator wheels all in the same direction. It is obvious that each rack-bar should be substantially at right-angles to the radial arm to which it is attached when the corresponding rock-shaft has completed just one-half of its maximum rotation.

It may be stated that inasmuch as the radial arms projected from the rock-shaft, and with which the key-levers engage, move about the center of the rock-shaft as a pivotal point, and the key-levers move about a different pivotal point, the inner end of each key-lever will have a sliding contact with the arm it engages during operation. Hence when the end of the key-lever is in the plane which passes through the pivotal point of the key-levers and the center of the rock-shaft it will be nearer the rock-shaft than at any other time. Hence if the outer end of the key-lever, or in other words the finger-piece, be depressed a certain distance when the inner end of said key-lever is at this point the shaft will be rocked or rotated farther than at any other point. However, this point is immaterial, since each key-lever has but one distance of depression, and it is adjusted to rotate the rock-shaft the proper distance by its full depression.

It is obvious that the radial arms with which the key-levers engage should be substantially in the plane passing through the center of the rock-shaft and the pivotal point of the key-levers when the rock-shaft has completed one-half its maximum rotation. Thus if the rock-shaft have a maximum rotation of one-fifth of a revolution the arms will normally be inclined downward about thirty-six degrees from said plane. Arms 12 and 13 point rearward, while arms 14 and 15 point forward, for the purpose of making the key-levers more nearly the same length. When rock-shaft 9 is rotated each arm 13 passes up between two adjacent arms 14, and when rock-shaft 10 is rotated each arm 14 passes up between two adjacent arms 13.

It will be observed that the key-levers which extend the farthest rearward also extend the farthest forward, in order to secure the same proportions and the same lever-power as the other keys, as will be readily understood.

Having thus described my invention, what I claim as new, and desire to secure by Letters Patent, is—

1. In a cash register and indicator, the combination with the pivoted key-levers, of two transverse rock-shafts, registering mechanism, mediate mechanism between said shafts and said registering mechanism, arms projected from said shafts, respectively, each arm being in the path traversed by the inner end of a key-lever, and each arm being arranged to pass up between two arms of the adjacent shaft, substantially as set forth.

2. In a cash register and indicator, the combination with the pivoted key-levers, of two transverse rock-shafts, registering mechanism, mediate mechanism between said shafts and said registering mechanism, arms projected from said shafts, respectively, each arm being operated by the inner end of a key-lever, and each arm being arranged to pass up between two arms of the adjacent shaft, and a transverse bar having steps or graduations arranged in the paths traversed by the key-levers, respectively, to secure unequal lengths of stroke to the different keys, substantially as set forth.

3. In a cash register and indicator, the combination with the pivoted key-levers, of two transverse rock-shafts, arms projected from said shafts, respectively, each arm being operated by the inner end of a key-lever, and each arm being arranged to pass up between two arms of the adjacent shafts, two rotatable wheels, means for rotating each of said wheels in unison with its corresponding shaft, and registering mechanism deriving motion from said wheels, substantially as set forth.

4. In a cash register and indicator, the combination with the key-levers, of two transverse rock-shafts, arms projected from said shafts, respectively, each arm being operated by the inner end of a key-lever, and each arm being arranged to pass up between two arms of the adjacent shaft, two rotatably mounted toothed wheels, pawls carried by arms projected from said shafts, respectively, said pawls being adapted to engage the teeth of said wheels, respectively, to rotate the wheels in unison with the shafts, respectively, locking-dogs to prevent the backward rotation of the wheels, registering disks, and connections between said toothed wheels and said registering disks, substantially as set forth.

5. In a cash register and indicator, the combination with the key-levers, of two transverse rock-shafts, arms projected from said shafts, respectively, each arm being operated by the inner end of a key-lever, and each arm being arranged to pass up between two arms of the adjacent shaft, springs tending to hold said shafts against rotation, registering mechanism, and mediate mechanism between said shafts and said registering mechanism, substantially as set forth.

6. In a cash-register and indicator, the combination with the key-levers, of a rock-shaft extending transversely across said key-levers and journaled in the frame, registering mechanism, a connection between the said shaft and the said registering mechanism, arms projected from said shaft, each arm being in the path traversed by the inner end of a key-lever, and a transverse bar placed above said key-levers and having steps or graduations on its under side to secure different distances of stroke to the different keys, substantially as set forth.

7. In a cash register and indicator, the combination with the key-levers having their inner ends turned upward, respectively, of a rock-shaft extending transversely across said key-levers and journaled in the frame, registering mechanism, a connection between the said shaft and the said registering mechanism, arms projected from said shaft, each arm being in the path traversed by the inner end of a key-lever, and a transverse bar placed above said key-levers and having steps or graduations on its under side to secure different distances of stroke to the different keys, substantially as set forth.

8. In a cash-register and indicator, the combination with the key-levers, of a transverse rock-shaft, registering mechanism, a connection between the said shaft and the said registering mechanism, means for rotating the shaft upon operating a key-lever, a transverse bar placed above said key-levers and having steps or graduations on its under side, and upward projections on said key-levers, designed to engage said steps or graduations and limit the motion of the keys, respectively, substantially as set forth.

9. In a cash register and indicator, the combination with the key-levers, of a transverse rock-shaft, means for rotating the shaft upon operating a key-lever, a rotatably mounted toothed wheel, a pawl carried by an arm projected from said shaft, said pawl being adapted to engage the teeth of said wheel to rotate the wheel forward in unison with the shaft, a locking dog to prevent the backward rotation of the wheel, a smaller wheel rigidly mounted upon a vertical rotatable shaft and meshing with said rotatable wheel, and a registering disk rigidly mounted upon the upper end of said vertical shaft, and additional registering disks deriving motion from said first-named disk, substantially as set forth.

10. In a cash register and indicator, the combination with the key-levers, of a rock-shaft extending transversely across said key-levers, a spring tending to hold said shaft against rotation, means for rotating said shaft upon operating a key-lever, a toothed segment carried by said shaft, a locking-dog engaging said toothed segment and preventing the shaft from returning to its initial position after being operated, and registering mechanism and indicating mechanism deriving motion, respectively, from said rock-shaft, substantially as set forth.

11. In a cash register and indicator, the combination with the key-levers, of a transverse rock-shaft, an arm depended from said shaft, a spring having one end attached to the end of said arm and tending to hold said shaft against rotation, means for rotating said shaft upon operating a key-lever, means for preventing said shaft from returning to its initial position after being operated, and means for releasing the shaft to return to its initial position, substantially as set forth.

12. In a cash register and indicator, the combination with the key-levers, of a transverse rock-shaft, an arm depended from said shaft, a spring having one end attached to the end of said arm and tending to hold said shaft against rotation, means for rotating said shaft upon operating a key-lever, a toothed segment carried by said shaft, a locking-dog engaging said toothed segment and preventing the shaft from returning to its initial position after being operated, and registering mechanism deriving motion from said rock-shaft, substantially as set forth.

13. In a cash register and indicator, the combination with the key-levers, of a transverse rock-shaft, an arm depended from said shaft, a spring having one end attached to the end of said arm and tending to hold said shaft against rotation, a series of arms projected from said shaft, each arm being operated by the inner end of a key-lever, a toothed segment carried by said shaft, a locking-dog engaging said toothed segment and preventing the shaft from returning to its initial position after being operated, and registering mechanism deriving motion from said rock-shaft, substantially as set forth.

14. In a cash register and indicator, the combination with a series of key-levers, of a transverse rock-shaft, means for rocking said shaft upon operating a key-lever, a spring tending to hold said shaft against rotation, means for holding said shaft against backward rotation after the operation of a key-lever, registering mechanism and indicating mechanism deriving motion, respectively, from said rock-shaft, a special key, and means whereby, upon operating said special key, the said shaft is released and allowed to return to its first position, substantially as set forth.

15. In a cash register and indicator, the combination with a series of key-levers, of a transverse rock-shaft, means for rocking said shaft upon operating a key-lever, a spring tending to hold said shaft against rotation, a toothed segment carried by said shaft, a locking-dog engaging said toothed segment and preventing the shaft from returning to its initial position after being operated, registering mechanism and indicating mechanism deriving motion, respectively, from said rock-shaft, a special key, and means whereby, upon operating said special key, the said shaft is released and allowed to return to its initial position, substantially as set forth.

16. In a cash-register and indicator, the combination with the key-levers, of a transverse rock-shaft, a spring tending to hold said shaft against rotation, means for rotating said shaft upon operating a key-lever, a toothed segment carried by said shaft, a locking-dog engaging said toothed segment and preventing the shaft from returning to its initial position after being operated, registering mechanism and indicating mechanism deriving motion, respectively, from said rock-shaft and a special key for disengaging the locking-dog from the toothed segment and allowing the shaft to return to its initial position, substantially as set forth.

17. In a cash-register and indicator, the combination with the key-levers, of a transverse rock-shaft, registering mechanism and indicating mechanism deriving motion, respectively, from said rock-shaft means for rocking said shaft upon operating a key-lever, a toothed segment carried by said shaft, a locking-dog engaging said toothed segment and preventing the shaft from returning to its initial position after being operated, a pin extending between said locking-dog and toothed segment, a special key for elevating said pin and disengaging the locking-dog from the toothed segment, and a spring for returning said shaft to its initial position, substantially as set forth.

18. In a cash register and indicator, the combination with the key-levers, of a transverse rock-shaft, registering mechanism deriving motion from said rock-shaft, means for rocking said shaft upon operating a key-lever, a toothed segment carried by said shaft, a locking-dog engaging said toothed segment and preventing the shaft from returning to its initial position after being operated, a pin extending between said locking-dog and toothed segment, a special key for elevating said pin and disengaging the locking-dog from the toothed segment, and a spring for returning said shaft to its initial position, substantially as set forth.

19. In a cash-register and indicator, the combination with the key-levers, of a transverse rock-shaft, means for rocking said shaft upon operating a key-lever, a toothed segment carried by said shaft, a locking-dog engaging said toothed segment and preventing the shaft from returning to its initial position after being operated, a vertically-movable bar, a special key, pins projecting one from either side of said bar, one of said pins extending between said locking-dog and toothed segment and the other extending over the inner end of said special key, and means for returning the shaft, upon being released, to its initial position, whereby, upon operating the special key, the said vertically-movable bar is elevated, the locking-dog is disengaged from the toothed segment, and the shaft is returned to its initial position, substantially as set forth.

20. In a cash-register and indicator, the combination with the frame, of a transverse shaft, key-levers pivotally placed upon said shaft, a transverse rock-shaft, arms projected from said rock-shaft, each arm being in the path traversed by the inner end of a key-lever, an arm depended from said shaft, a stop with which said arm is in contact, and a spring holding said arm normally in contact with said stop and tending to hold the rock-shaft against rotation, substantially as set forth.

21. In a cash-register and indicator, the combination with the key-levers, of a transverse rock-shaft, arms projected from said rocking shaft, each arm being operated by the inner end of a key-lever, a rotatable indicator wheel, a toothed wheel rigidly secured to said indicator wheel, a rack-bar engaging said toothed wheel, and means whereby the bar is reciprocated when the shaft is rocked, substantially as set forth.

22. In a cash-register and indicator, the combination with a series of key-levers, of a transverse rock-shaft, means for rocking said shaft upon operating a key-lever, a spring tending to hold said shaft against rotation, means for holding said shaft against backward rotation after the operation of a key-lever, a mounted indicating wheel, a toothed wheel rigidly secured to or integral with said indicating wheel, a rack-bar engaging said toothed wheel, means for reciprocating said rack-bar when said shaft is rocked, a special key-lever, and means whereby, upon operating said special key-lever, the said shaft is released and allowed to return to its initial position, and the indicator wheel is returned to zero, substantially as set forth.

23. In a cash-register and indicator, the combination with a series of key-levers, of a transverse rock-shaft, means for rotating said shaft upon operating a key-lever, a spring tending to hold said shaft against rotation, means for holding said shaft against backward rotation after the operation of a key-lever, a mounted indicating wheel, a connection between said indicator wheel and said shaft, a cash drawer, a spring for propelling the drawer, a catch for holding the drawer closed, a connection between said catch and said indicating wheel, a special key-lever, and means whereby, upon operating said special key-lever, the said shaft is released and allowed to return, by means of the spring, to its initial position, the indicator wheel is returned to zero, the catch is disengaged from the cash drawer, and the spring propels the drawer, substantially as set forth.

24. In a cash-register and indicator, the combination with the key-levers, indicating mechanism, and mediate mechanism between the key-levers and indicating mechanism, of a cash drawer, a catch for holding the drawer closed, and means carried by the indicating mechanism for disengaging the catch when the said indicating mechanism is released, substantially as set forth.

25. In a cash-register and indicator, the combination with the key-levers, indicating wheels, and connections between the key-levers and indicating wheels, of a cash drawer, means for propelling the drawer, catches for holding the drawer closed, pins carried by the indicating wheels, respectively, and adapted to hold the catches out of engagement with the drawer until a key is operated, substantially as set forth.

26. In a cash-register and indicator, the combination with the indicating wheels, of a cash drawer, means for propelling the drawer, catches for holding the drawer closed, pins carried by the indicating wheels, respectively, and adapted to hold the catches out of engagement with the drawer until a key is operated, substantially as set forth.

27. In a cash-register and indicator, the combination with the frame, of a transverse shaft, key-levers pivotally mounted upon said shaft, a transverse rock-shaft, means for rocking the same when a key-lever is operated, a mounted indicator wheel, a toothed wheel rigidly secured to or integral with said indicator wheel, a rack-bar engaging said toothed wheel, a coiled spring for holding said rack-bar in engagement with said toothed wheel, one end of said spring being attached to the rack-bar and the other end being attached to the frame or casing, an arm projected from said rock-shaft, said arm being pivotally attached at its outer end to the end of said rack-bar, whereby the bar is reciprocated and the indicator wheel is rotated when the shaft is rocked, substantially as set forth.

28. In a cash-register and indicator, the combination with the key-levers, of a rock shaft extending across said key levers, means for rocking the shaft upon operating a key-lever, a rotatably mounted indicator wheel, a toothed wheel carried by or integral with said indicator wheel, a rack-bar deriving motion from said shaft and engaging said toothed wheel, whereby the wheel is rotated in unison with the shaft, and means to prevent the rock-shaft from returning to its initial position after a key has been operated, whereby the value of the registration is shown on the indicator wheel until another sale is to be registered, substantially as set forth.

29. In a cash register and indicator, the combination with the key-levers, of a transverse rock-shaft, arms projected from said rock-shaft, each arm being operated by the inner end of a key-lever, a rotatably-mounted indicator wheel, an operative connection between the indicator wheel and the rock-shaft, whereby the wheel is rotated by the rocking of the shaft, means to prevent the rock-shaft from returning to its initial position after being operated, registering mechanism deriving motion from said rock-shaft, a spring tending to hold the rock-shaft against rotation, a special key, and means whereby, upon operating said special key, the rock-shaft is released, the spring returns the shaft to its initial position, and the indicator wheel is returned to its initial position to show zero in the reading slot, substantially as set forth.

30. In a cash-register and indicator, the combination with the cash drawer, of a catch for holding the drawer closed, means for propelling the drawer, a rotatably mounted indicator wheel, and means carried by said indicator wheel whereby the catch is held out of engagement with the drawer when the said indicator wheel is in its initial or zero position, substantially as set forth.

31. In a cash-register and indicator, the combination with the cash drawer, of a catch for holding the drawer closed, means for propelling the drawer, an indicator wheel, and a pin or projection on said wheel which holds the catch out of engagement with the cash drawer when the wheel is in its initial or zero position, substantially as set forth.

32. In a cash-register and indicator, the combination with the cash drawer, of a catch for holding the drawer closed, an indicator wheel, and a pin or projection carried by said wheel which holds the catch out of engagement with the cash drawer when the wheel is in its initial or zero position, substantially as set forth.

33. In a cash-register and indicator, the combination with the cash drawer, of a pivoted catch for holding the drawer closed, means for propelling the drawer, an arm or projection extending up from said catch, said arm or projection having its upper end bent, an indicator wheel, a pin projecting from the side of said wheel, said pin being in engagement with the bent end of said arm and thus holding the catch out of engagement with the drawer when the indicator wheel is in its initial or zero position, and said pin being carried out of engagement with the bent end of said arm when the wheel is rotated to indicate the value of a registration, thus allowing the catch to drop down to engage the cash drawer, substantially as set forth.

34. In a cash register and indicator, the combination with the key-levers, of a transverse rock-shaft, means for rocking the shaft upon operating a key-lever, a rotatably mounted toothed wheel, means for rotating said wheel in one direction in unison with the shaft, and means to prevent said wheel from rotating until the said shaft has passed its first space or unit of motion, substantially as set forth.

35. In a cash-register and indicator, the combination with the key-levers, of a transverse rock-shaft, means for rocking the shaft upon operating a key-lever, a rotatably mounted toothed wheel, a pawl adapted to engage the teeth of said wheel to rotate the wheel forward in unison with the shaft, and means to prevent the pawl from engaging the first tooth in its line of travel, substantially as set forth.

36. In a cash-register and indicator, the combination with the key-levers, of a transverse rock-shaft, means for rocking the shaft upon operating a key-lever, a rotatably mounted toothed wheel, a pawl carried by an arm projected from said shaft, said pawl being adapted to engage the teeth of said wheel to rotate the wheel forward in unison with the shaft, and means to prevent the pawl from engaging the first tooth in its line of travel, substantially as set forth.

37. In a cash-register and indicator, the combination with the key-levers, of a transverse rock-shaft, means for rotating the shaft upon operating a key-lever, a pawl carried by an arm projected from said shaft, a locking-dog engaging the teeth of said wheel to prevent the backward rotation of the wheel, said pawl resting normally upon said locking-dog with its engaging end the space of one tooth from the engaging end of said locking-dog, registering mechanism, and a connection between said toothed wheel and said registering mechanism, substantially as set forth.

38. In a cash-register and indicator, the combination with the case and a movable money drawer arranged in the same, of an indicating wheel journaled rotatably within the case, and a catch operated by said wheel, whereby the drawer is unlocked, substantially as set forth.

39. In a cash-register and indicator, the combination with the case and a movable money drawer arranged in the same, of an indicating wheel mounted within the case, a catch operated by said wheel, and an alarm which is operated by the money drawer when the same is closed, substantially as set forth.

40. In a cash-register and indicator, the combination with the case and a money drawer sliding in the same, of a pivoted locking catch or lever adapted to engage with the money drawer, an indicating wheel mounted within the case, and a pin or projection arranged on said wheel and adapted to disengage said catch from the money drawer, substantially as set forth.

In testimony whereof I affix my signature in presence of two witnesses.

CYRUS PRICE.

Witnesses:
S. R. CASSELLMAN,
R. W. PRICE.